US010931829B1

(12) United States Patent
Paczkowski et al.

(10) Patent No.: US 10,931,829 B1
(45) Date of Patent: Feb. 23, 2021

(54) USAGE DATA INDEX FOR WIRELESS COMMUNICATION NETWORKS (71) Applicant: Sprint Communications Company L.P., Overland Park, KS (US)

(72) Inventors: Lyle Walter Paczkowski, Mission Hills, KS (US); Mark Richard Bales, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/588,409

(22) Filed: Sep. 30, 2019

(51) Int. Cl.
*H04M 15/00* (2006.01)
*H04L 9/06* (2006.01)
*G06F 16/182* (2019.01)
*H04L 12/14* (2006.01)

(52) U.S. Cl.
CPC ........ *H04M 15/31* (2013.01); *G06F 16/1824* (2019.01); *H04L 9/0643* (2013.01); *H04L 12/14* (2013.01); *H04M 15/41* (2013.01); *H04L 2209/38* (2013.01)

(58) Field of Classification Search
CPC . H04L 2209/80; H04L 12/1407; H04L 12/14; H04W 4/24; H04M 15/66; H04M 15/8038; H04M 15/50
See application file for complete search history.

(56) References Cited

U.S. PATENT DOCUMENTS

| 8,275,830 | B2 | 9/2012 | Raleigh |
| 10,291,627 | B2 | 5/2019 | Gleichauf |
| 10,299,128 | B1 | 5/2019 | Suthar et al. |
| 2012/0215911 | A1 | 8/2012 | Raleigh et al. |
| 2018/0343266 | A1 | 11/2018 | Lotter et al. |
| 2019/0095995 | A1 | 3/2019 | Rohlfs |
| 2019/0191293 | A1* | 6/2019 | Nelson ................. H04W 4/50 |
| 2020/0244472 | A1* | 7/2020 | Dinkelaker ........... H04L 47/783 |

FOREIGN PATENT DOCUMENTS

| WO | 2018136059 A1 | 7/2018 |
| WO | 2019070619 A1 | 4/2019 |

* cited by examiner

*Primary Examiner* — Nam T Huynh (57) ABSTRACT

In a wireless communication network, index circuitry transfers a reference Distributed Ledger (DL) request to reference circuitry. The reference circuitry transfers a response indicating a reference DL ID to the index circuitry. The index circuitry transfers the reference DL ID to the wireless communication network. The reference circuitry receives usage data and the reference DL ID from the wireless communication network. The reference circuitry stores the usage data in reference DL blocks, generates a usage abstraction of the usage data, and transfers the reference DL ID and the usage abstraction to the index circuitry. The index circuitry stores the usage abstraction and the reference DL ID in index DL blocks. The index circuitry receives requests having the reference DL ID and returns the usage abstraction. The reference circuitry receives requests having the reference DL ID and usage abstraction ID and returns the usage data.

20 Claims, 8 Drawing Sheets

USAGE DATA INDEX FOR WIRELESS COMMUNICATION NETWORKS

TECHNICAL BACKGROUND

Wireless communication networks provide wireless data services to wireless user devices. Exemplary wireless data services include voice calling, Internet access, media streaming, machine communications, vehicle control, and social networking. Exemplary wireless user devices comprise phones, computers, vehicles, robots, sensors, and drones. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Narrowband Internet of Things (NB IoT).

The wireless protocols transport user data and network signaling. To deliver the wireless data services, the wireless access nodes often exchange user data and network signaling with wireless network cores. The wireless network cores host network controllers and gateways. The network controllers exchange network signaling with the wireless user devices, access nodes, and gateways to direct the delivery of the wireless data services. The wireless access nodes and gateways exchange user data to deliver the wireless data services.

Some of the network controllers and gateways track the delivery of the wireless data services to the wireless user devices. The gateways generate usage data that characterizes their handling of the user data by device, time, location, service, and the like. A common example of usage data is a Call Detail Record (CDR) that is generated by LTE networks. The wireless communication networks transfer the usage data to an accounting computer system that classifies and rates the usage data. The classification identifies services, accounts, and the like. The rating processes the classified data to generate billable costs per user service plans.

A wireless communication network serves home user devices and also bills the home users for the corresponding service costs. The same wireless communication network also serves roaming user devices that are home to other networks. The roaming network does not bill the users of roaming devices. Instead, the roaming network transfers usage data for the roaming user devices to their home networks. The home networks bill then their own home users for the roaming services. The roaming and home wireless communication networks settle the roaming costs among themselves.

Distributed ledgers are used to handle transactional data like account balances using a blockchain format. A distributed ledger has multiple geographically-diverse computer nodes that each have a copy of chain code and a copy of data blocks. The computer nodes execute the chain code to test and then build a consensus on the results of chain code execution. For example, multiple computer nodes each execute chain code to determine a user's new balance and then build a consensus on the new balance before proceeding. Once a consensus is reached, then the computer nodes each store a new data block in their own blockchain database. The data block indicates chain code results and has a hash of the previous data block. The redundancy, consensus, and hashes make the distributed ledger highly reliable, secure, and visible.

Distributed ledgers may be used between wireless communication networks to handle usage data for roaming user devices. Unfortunately, the static nature of chain code and blockchain databases may cause problems. The chain code may become obsolete as wireless data services change. The databases may overload or slow when wireless data services are heavily used for extended periods of time. Moreover, the databases may become huge and difficult to analyze.

TECHNICAL BACKGROUND

In a wireless communication network, index circuitry transfers a reference Distributed Ledger (DL) request to reference circuitry. The reference circuitry transfers a response indicating a reference DL ID to the index circuitry. The index circuitry transfers the reference DL ID to the wireless communication network. The reference circuitry receives usage data and the reference DL ID from the wireless communication network. The reference circuitry stores the usage data in reference DL blocks, generates a usage abstraction of the usage data, and transfers the reference DL ID and the usage abstraction to the index circuitry. The index circuitry stores the usage abstraction and the reference DL ID in index DL blocks. The index circuitry receives requests having the reference DL ID and returns the usage abstraction. The reference circuitry then receives requests having the reference DL ID and the usage abstraction ID and returns the usage data.

DETAILED DESCRIPTION

Figure 1:
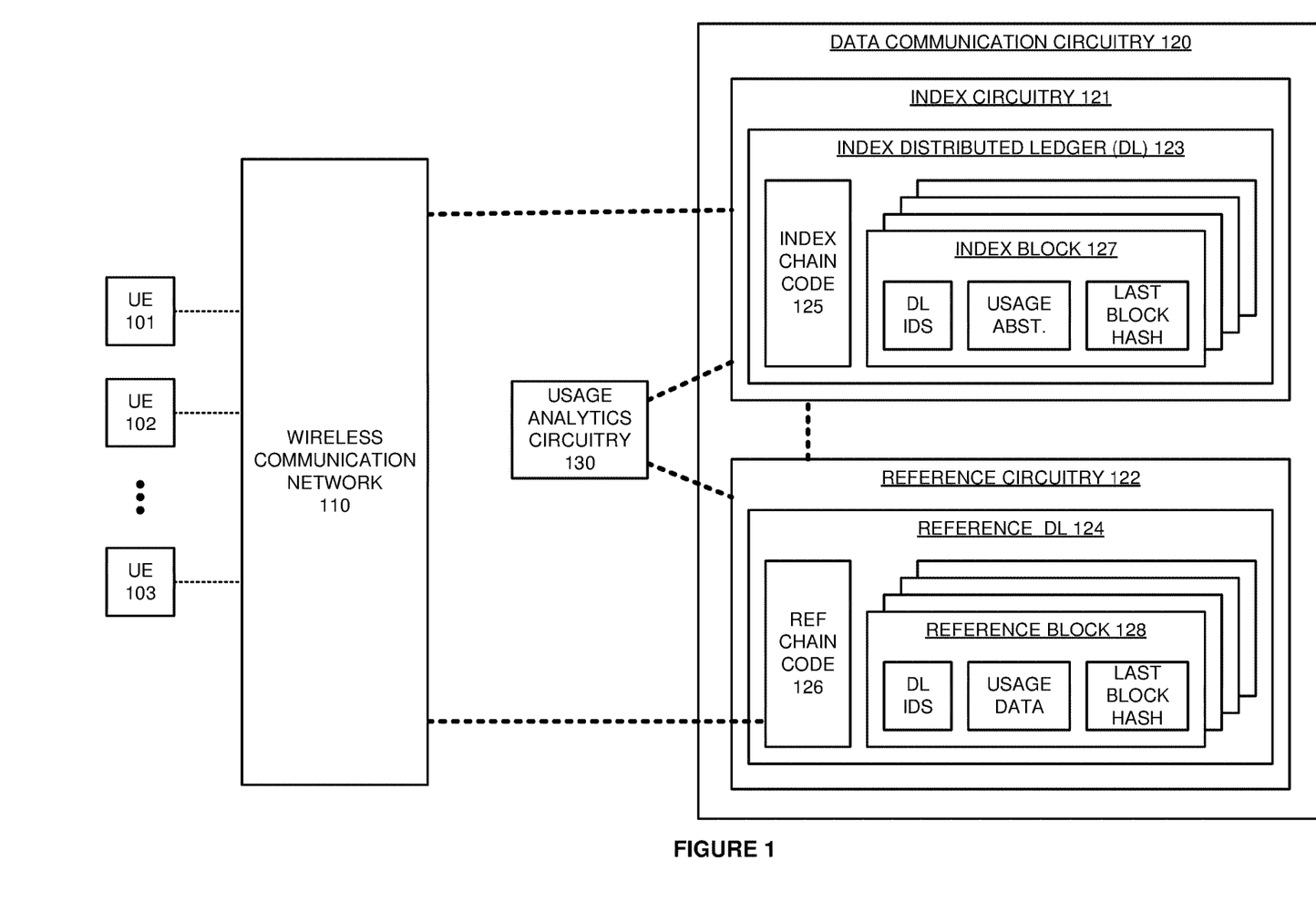
FIG. 1 illustrates data communication circuitry that indexes usage data from a wireless communication network for usage analytics circuitry.

FIG. 1 illustrates data communication circuitry 120 that indexes usage data from wireless communication network 110 for usage analytics circuitry 130. Data communication circuitry 120 comprises index circuitry 121 and reference circuitry 122. Index circuitry 121 and reference circuitry 122 comprise microprocessors, memory, software, transceivers, and bus connections. The microprocessors comprise Central Processing Units (CPUs), Graphical Processing Units (GPUs), Application-Specific Integrated Circuits (ASICs), and/or the like. The memories comprise Random Access Memory (RAM), flash circuitry, disk drives, and/or the like.

The memories store software like operating systems, network applications, and virtual components Index circuitry 121 comprises index Distributed Ledger (DL) 123. Index DL 123 comprises index chain code 125, top index block 127, and older index blocks that are shown below index block 127. Except for the initial genesis block, each index block has an index DL ID, reference DL ID, usage abstraction (ABST), and a last block hash. Reference circuitry 122 comprises reference DL 124. Reference DL 124 comprises reference chain code 126, top reference block 128, and older reference blocks that are shown below reference block 128. Except for the initial genesis block, each reference block has an index DL ID, reference DL ID, usage data, and a last block hash.

UEs 101-103 comprise user circuitry that interacts with users. UEs 101-103 also comprise radio circuitry that wirelessly communicates with wireless communication network 110. UEs 101-103 might be phones, computers, robots, sensors, vehicles, drones, data appliances, or some other user apparatus with wireless communication circuitry.

Wireless communication network 110 comprises wireless access points and other network elements like network controllers, gateways, and databases. Wireless communication network 110 serves UEs 101-103 with wireless communication services. The wireless access points include antennas, modulators, amplifiers, filters, digital/analog interfaces, microprocessors, memory, software, transceivers, and bus connections. The other network elements include microprocessors, memory, software, transceivers, and bus connections. The microprocessors comprise Digital Signal Processors (DSPs), CPUs, GPUs, Field Programmable Gate Arrays (FPGAs), ASICs, and/or the like. The memories comprise RAM, flash circuitry, disk drives, and/or the like. The memories store software like operating systems, network applications, and virtual components.

Usage analytics circuitry 130 comprises microprocessors, memory, software, transceivers, and bus connections. The microprocessors comprise CPUs, GPUs, ASICs, and/or the like. The memories comprise RAM, flash circuitry, disk drives, and/or the like. The memories store software like operating systems, analytic applications, and virtual components.

Index circuitry 121 and reference circuitry 122 are coupled to each other, wireless communication network 110, and usage analytics circuitry 130 by network communication links. The network communication links may use Institute of Electrical and Electronic Engineers (IEEE) 802.3 (Ethernet), Time Division Multiplex (TDM), Data Over Cable System Interface Specification (DOCSIS), Internet Protocol (IP), IEEE 802.11 (WIFI), Long Term Evolution (LTE), Fifth Generation New Radio (5GNR), Narrowband Internet-of-Things (NB-IoT), or some other data protocol. Wireless communication network 110 and User Equipment (UEs) 101-103 are coupled over wireless communication links. The wireless links may use WIFI, LTE, 5GNR, NB-IoT, or some other wireless protocol. WIFI, LTE, 5GNR, and NB-IoT may use frequencies in the low-band, mid-band, millimeter-wave band, and/or some other part of the wireless spectrum. Ethernet and WIFI are described in IEEE documents. LTE, 5GNR, and NB-IoT are described in Third Generation Partnership Project (3GPP) documents.

In operation, index circuitry 121 receives a usage data request for wireless communication network 110. The usage data request may be from wireless communication network 110 or from another entity on behalf of wireless communication network 110. Index circuitry 121 starts index DL 123 for wireless communication network 110. Index DL 123 has an ID like a code, name, address, or the like. Responsive to the usage data request, index circuitry 121 transfers a reference DL request to reference circuitry 122 to establish reference DL 124 for wireless communication network 110. The reference DL request indicates the index DL ID.

Reference circuitry 122 receives the reference DL request and starts reference DL 124 for wireless communication network 110. The reference DL has an ID like a code, name, address, or the like. Reference circuitry 122 transfers a reference DL response that indicates the index DL ID and the reference DL ID to index circuitry 121. Index circuitry 121 receives the reference DL response and associates the index DL ID, reference DL ID, and wireless communication network 110 with one another. Index circuitry 121 transfers a usage data response that indicates the reference DL ID and the index DL ID for wireless communication network 110. Index circuitry 121 may transfer the usage data response to wireless communication network 110 or to another entity on behalf of wireless communication network 110.

UEs 101-103 and wireless communication network 110 exchange wireless signals that carry user data and network signaling to deliver wireless data services to UEs 101-103. The network elements in wireless communication network 110 generate usage data that characterizes the exchange of the wireless signals and the delivery of the wireless data services to UEs 101-103 by wireless communication network 110. The usage data typically indicates UEs 101-103, their data transfer amounts, and the data transfer times. The usage data may also indicate UE location, data service, data type, and other pertinent information. In some examples, the usage data comprises Call Detail Records (CDRs). Wireless communication network 110 transfers the usage data along with the reference DL ID and index DL ID to reference circuitry 122.

Reference circuitry 122 receives the reference DL ID, index DL ID, and usage data from wireless communication network 110. In response to the reference DL ID, reference circuitry 122 executes reference DL chain code 126 for reference DL 124. In response to the code execution, reference circuitry 122 stores the usage data in reference DL blocks like reference block 128. These reference DL blocks include the index DL ID, reference DL ID, usage data, and last block hashes. In some examples, the reference DL chain code classifies and rates the usage data before storage.

In response to a data amount, time period, or some other abstraction trigger, reference circuitry 122 generates a usage abstraction of the usage data. Reference chain code 126 performs the abstraction. The abstraction process may use a mask, compression, translation, redaction, and/or, or some other technique to abstract the usage data. The usage abstractions have usage abstraction IDs and may comprise abstractions of classified and rated usage data.

Reference circuitry 122 transfers the index DL ID, reference DL ID, and the usage abstraction to index circuitry 121. Index circuitry 121 receives the usage abstraction, index DL ID, and reference DL ID. In response to the index DL ID, index circuitry 121 executes index DL chain code 125 for the index DL. In response to the code execution, index circuitry 121 stores the usage abstraction a new index DL block like index block 127. The new DL index block includes the index DL ID, reference DL ID, usage abstraction, and last block hashes.

Usage analytics circuitry 130 generates an index data request for wireless communication network 110 that includes the index DL ID and the reference DL ID. The index data request may indicate an amount of requested usage abstractions. Usage analytics circuitry 130 transfers the usage data request to index circuitry 121. Index circuitry 121 receives the index data request for wireless communication network 110 and responsively identifies one or more usage abstractions for the index DL ID and reference DL ID based on the requested amount. Index circuitry 121 transfers the usage abstractions, index DL ID, and reference DL ID to usage analytics circuitry 130.

Usage analytics circuitry 130 receives the usage abstractions, index DL ID, and reference DL ID from index circuitry 121. In response, usage analytics circuitry 130 generates a reference data request for wireless communication network 110 that includes the index DL ID, reference DL ID, and some of the usage abstraction IDs. Usage analytics circuitry 130 transfers the reference data request to reference circuitry 122. Reference circuitry 122 receives the reference data request and responsively identifies the usage data for index DL ID, reference DL ID, and selected abstraction IDs. Reference circuitry 122 transfers the complete usage data for the selected abstractions to usage analytics circuitry 130. The usage data may comprise the classified and rated usage data.

After storing a pre-determined amount of the usage data, the expiration of a time period, and/or some other exhaustion trigger, reference circuitry 122 transfers a reference DL exhaustion notice to index circuitry 122. Index circuitry 122 receives the reference DL exhaustion notice and transfers another reference DL request to reference circuitry 122 to establish another reference DL for wireless communication network 110. Reference circuitry 122 receives the other reference DL request and the above operation repeats for the new reference DL. The exhaustion process may be used to switch from one reference DL to another or to add another reference DL while using the existing DL. For example, the exhaustion process could be used to modify the reference chain code. The exhaustion process could be used to add new reference chain code for a new wireless data service.

Wireless communication network 110 is divided into geographic areas like sectors, tracking areas, zones, or the like. The usage data indicates specific geographic areas where individual UEs 101-103 receive their wireless data services. Index circuitry 121 and reference circuitry 122 may associate the index DL ID, reference DL ID, usage data, and usage abstractions with their specific geographic areas. Thus, circuitry 121-122 may serve usage analytics circuitry 130 with indexed usage data for specific geographic areas. Data communication circuitry 120 may serve additional wireless communication networks and usage analytic engines in a similar manner.

Advantageously, data communication circuitry 120 indexes distributed ledgers that may store huge amounts of usage data. Moreover, data communication circuitry 120 effectively avoids database overload and efficiently replaces or supplements the distributed ledgers.

Figure 2:
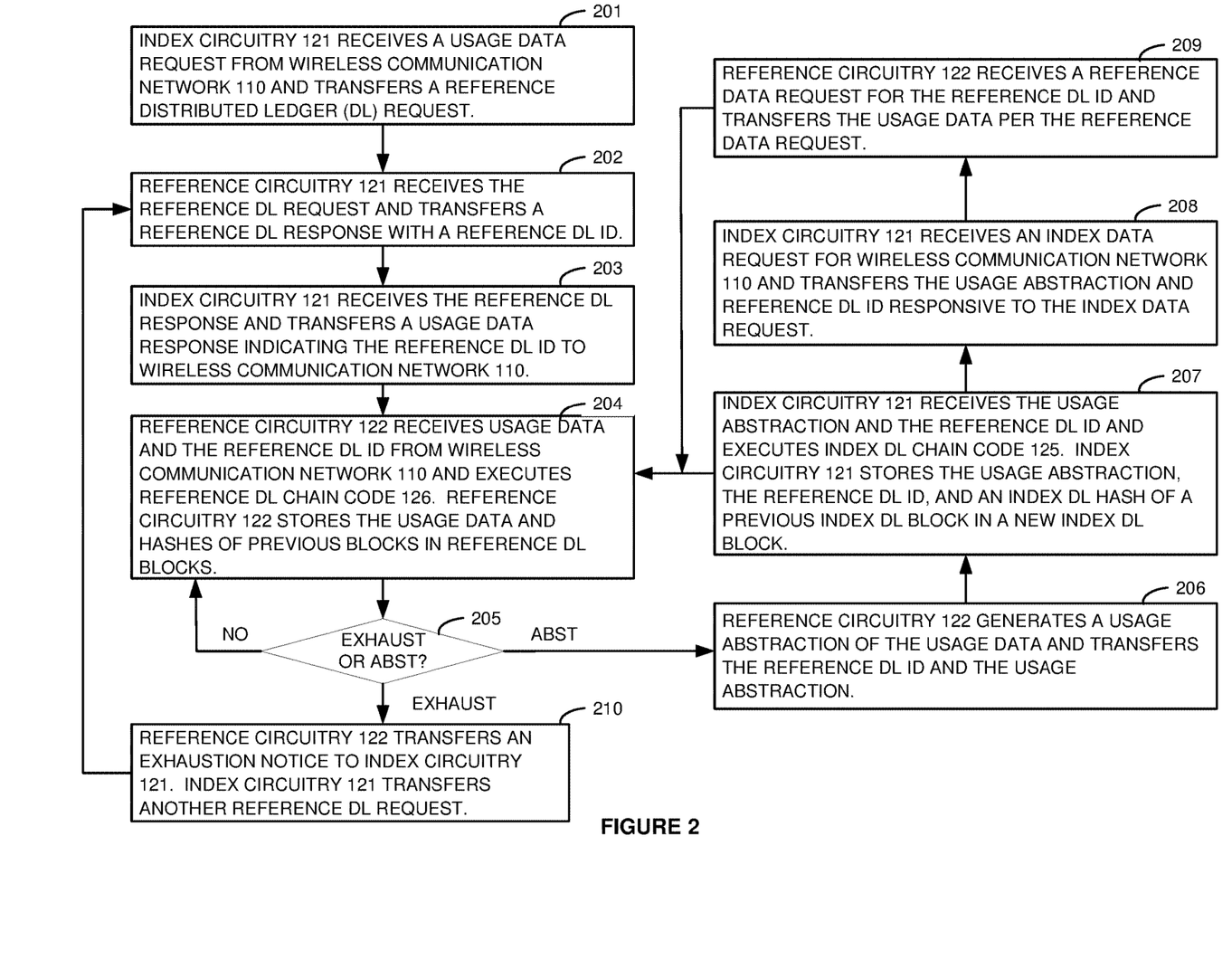
FIG. 2 illustrates the operation of the data communication circuitry to index the usage data from the wireless communication network for the usage analytics circuitry.

FIG. 2 illustrates the operation of data communication circuitry 120 to index the usage data from wireless communication network 110 for usage analytics circuitry 130. Index circuitry 121 receives a usage data request from wireless communication network 110 (201). Index circuitry 121 starts index Distributed Ledger (DL) 123 for wireless communication network 110 and transfers a reference DL request to reference circuitry 122 to establish reference DL 124 for wireless communication network 110 (201).

Reference circuitry 122 receives the reference DL request and starts reference DL 124 for wireless communication network 110 (202). Reference circuitry 122 transfers a reference DL response that indicates the reference DL ID to index circuitry 121 (202). Index circuitry 121 receives the reference DL response and transfers a usage data response that indicates the reference DL ID to wireless communication network 110 (203). Reference circuitry 122 receives the reference DL ID and usage data from wireless communication network 110 (204). Reference circuitry 122 executes reference DL chain code 126 for reference DL 124 (204). Reference circuitry 122 stores the usage data, reference DL ID, and hashes in reference DL blocks (204). In some examples, the reference DL chain code classifies and rates the usage data and then stores classified and rated usage data in the reference DL blocks (204).

In response to an abstraction trigger (205), reference circuitry 122 generates a usage abstraction of the usage data (206). Reference circuitry 122 transfers the reference DL ID and usage abstraction to index circuitry 121 (206). Index circuitry 121 receives reference DL ID and usage abstraction (207). Index circuitry 121 executes index DL chain code 125 for index DL 123 (207). Index circuitry 121 stores the reference DL ID, usage abstraction, and hash in a new index DL block (207).

Index circuitry 121 receives an index data request for wireless communication network that indicates the reference DL ID (208). Index circuitry 121 identifies usage abstractions for the reference DL ID (208). Index circuitry 121 transfers the usage abstractions and reference DL ID to usage analytics circuitry 130 (208). Reference circuitry 122 receives a reference data request from usage analytics circuitry 130 that has the reference DL ID and usage abstraction IDs (209). Reference circuitry 122 identifies the usage data for the reference DL ID and abstraction IDs (209). Reference circuitry 122 transfers the complete usage data to usage analytics circuitry 130 (209). In some examples, the usage data comprises classified and rated usage data (209).

In response to an exhaustion trigger (205), reference circuitry 122 transfers a reference DL exhaustion notice to index circuitry 122 (210). Index circuitry 122 receives the reference DL exhaustion notice and transfers another reference DL request to reference circuitry 122 to establish another reference DL for wireless communication network 110 (210). Reference circuitry 122 receives the other reference DL request and the operation repeats (202). A similar process (210) can be used to add another reference DL for wireless communication network 110 while still using reference DL 124.

Figure 3:
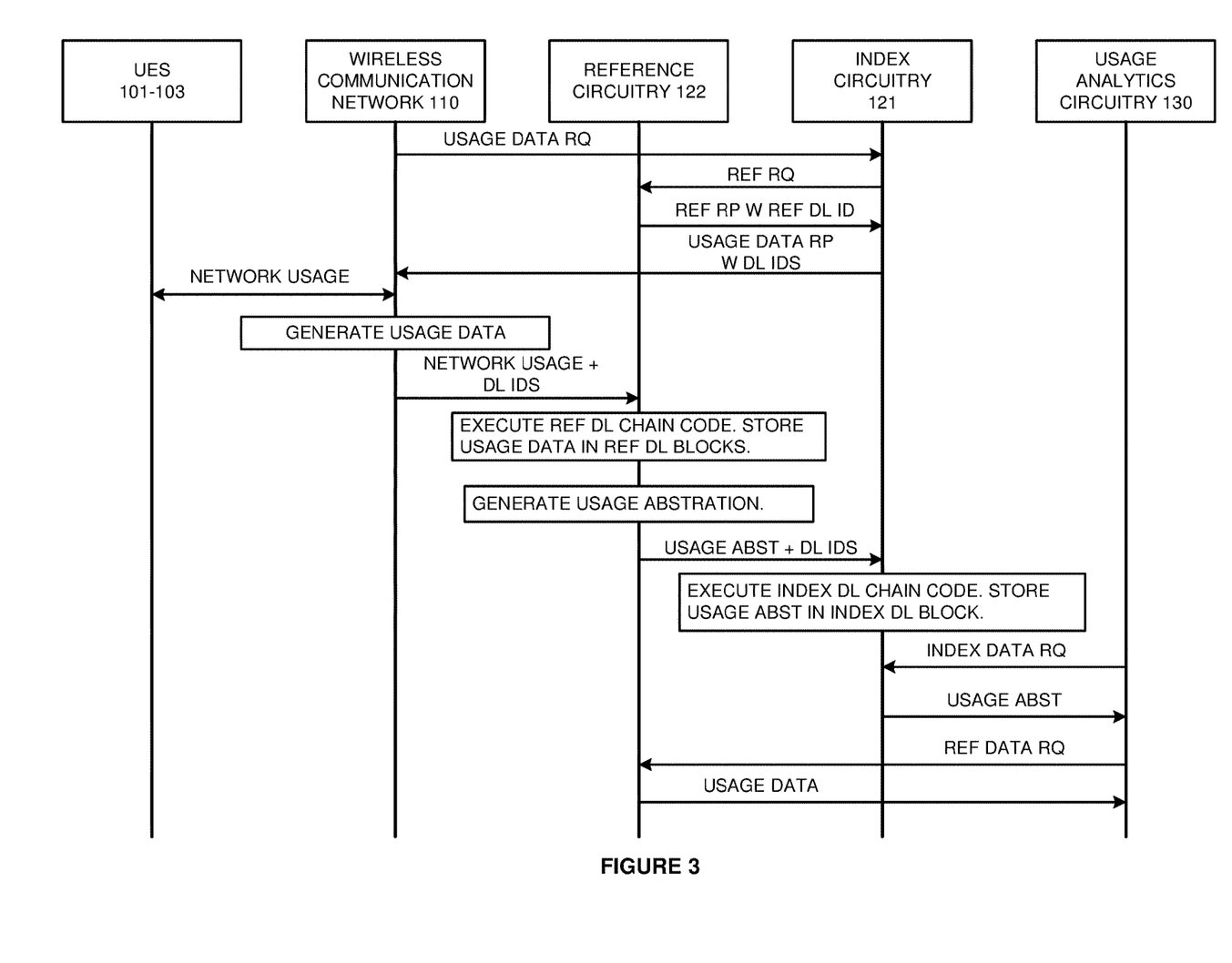
FIG. 3 illustrates the operation of the data communication circuitry to index the usage data from the wireless communication network for the usage analytics circuitry.

FIG. 3 illustrates the operation of data communication circuitry 120 to index the usage data from wireless communication network 110 for usage analytics circuitry 130. Wireless communication network 110 transfers a usage data request to index circuitry 121. Index circuitry 121 receives a usage data request and starts index DL 123 that has an index DL ID. Index circuitry 121 also transfers a reference DL request to reference circuitry 122 to establish reference DL 124 for wireless communication network 110. The reference DL request indicates the index DL ID.

Reference circuitry 122 receives the reference DL request and starts reference DL 124 having a reference DL ID for wireless communication network 110. Reference circuitry 122 transfers a reference DL response that indicates the index DL ID and reference DL ID to index circuitry 121. Index circuitry 121 receives the reference DL response and associates wireless communication network 110, the index DL ID, and the reference DL ID with one another. Index circuitry 121 transfers a usage data response that indicates the reference DL ID and the index DL ID to wireless communication network 110.

UEs 101-103 use wireless communication network 110 for wireless data services. Wireless communication network 110 generates usage data that characterizes the network usage by UEs 101-103. The usage data may comprise Call Detail Records (CDRs). Wireless communication network 110 transfers the usage data along with the reference DL ID and index DL ID to reference circuitry 122.

Reference circuitry 122 receives the reference DL ID, index DL ID, and the usage data from wireless communication network 110. In response to the reference DL ID and index DL ID, reference circuitry 122 executes reference DL chain code 126 for the reference DL. In response to the code execution, reference circuitry 122 stores the usage data in reference DL blocks like reference block 128. These reference DL blocks include the reference DL ID, index DL ID, usage data, and hashes of the previous reference block. In some examples, reference DL chain code 126 classifies and rates the usage data.

In response to an abstraction trigger like a data amount or time period, reference circuitry 122 generates a usage abstraction of the usage data. Reference circuitry 122 transfers the index DL ID, reference DL ID, and the usage abstraction to index circuitry 121. Index circuitry 121 receives the usage abstraction, index DL ID, and reference DL ID. In response to the index DL ID, index circuitry 121 executes index DL chain code 125 for the index DL. In response to the code execution, index circuitry 121 stores the usage abstraction a new index DL block like index block 127. The new DL index block includes the index DL ID, reference DL ID, usage abstraction, and hash of the previous index block.

Usage analytics circuitry 130 generates an index data request for wireless communication network 110 that includes the index DL ID, reference DL ID, and a time period for requested usage abstractions. Usage analytics circuitry 130 transfers the usage data request to index circuitry 121. Index circuitry 121 receives the index data request and responsively identifies one or more usage abstractions for the index DL ID, reference DL ID, and time period. Index circuitry 121 transfers the usage abstractions, index DL ID, and reference DL ID to usage analytics circuitry 130.

Usage analytics circuitry 130 receives the usage abstractions, index DL ID, and reference DL ID from index circuitry 121. In response, usage analytics circuitry 130 selects some of the usage abstractions and generates a reference data request that includes the index DL ID, reference DL ID, and usage abstraction IDs from the selected usage abstractions. Usage analytics circuitry 130 transfers the reference data request to reference circuitry 122. Reference circuitry 122 receives the reference data request and responsively identifies the usage data for index DL ID, reference DL ID, and selected abstraction IDs. Reference circuitry 122 transfers the usage data to usage analytics circuitry 130. The usage data may comprise the classified and rated usage data. Usage analytics circuitry 130 processes usage abstractions to select and retrieve the desired usage data.

Figure 4:
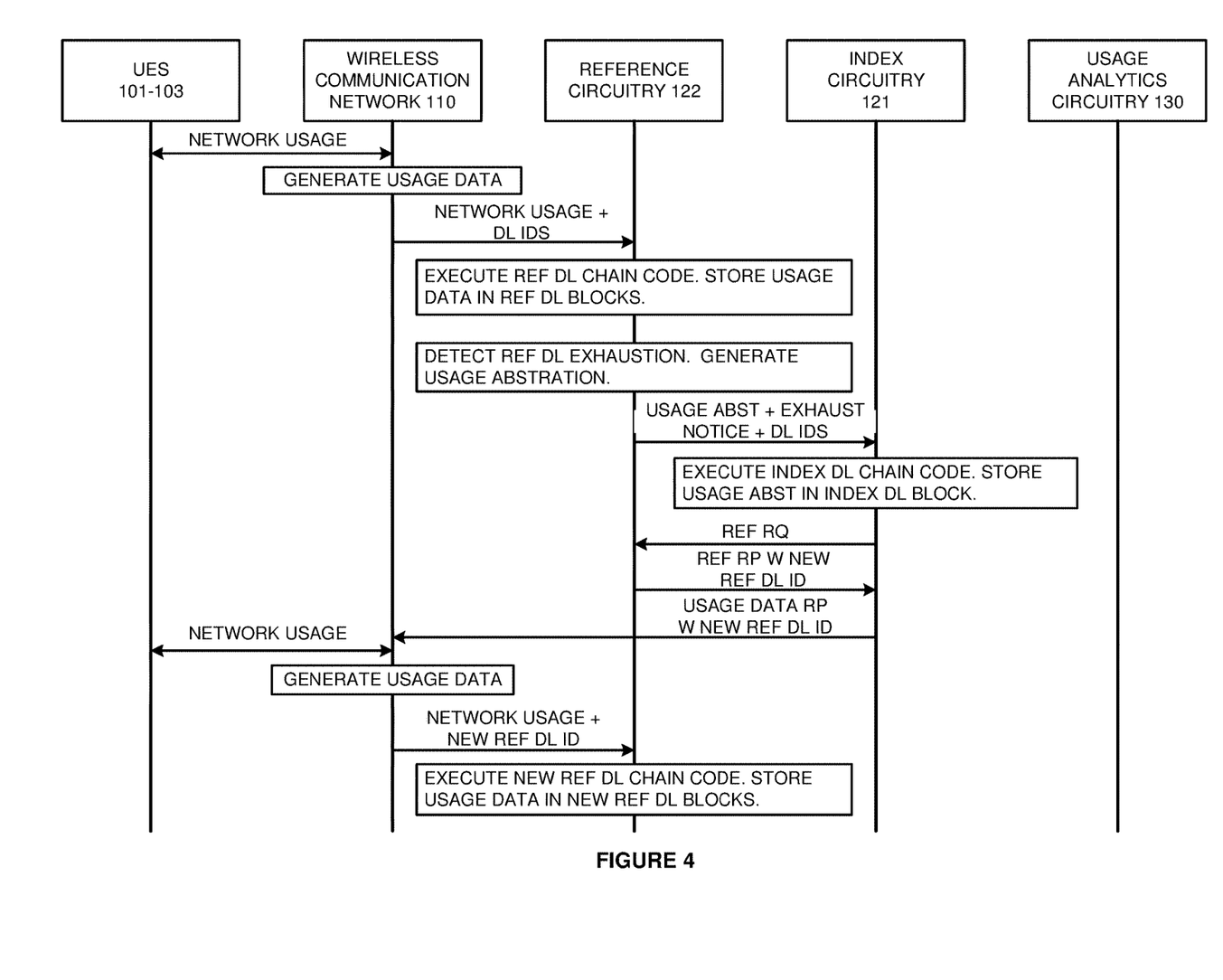
FIG. 4 illustrates the operation of the data communication circuitry to index the usage data from the wireless communication network for the usage analytics circuitry.

FIG. 4 illustrates the operation of data communication circuitry 120 to index the usage data from wireless communication network 110 for usage analytics circuitry 130. UEs 101-103 use wireless communication network 110 for wireless data services. Wireless communication network 110 generates usage data and transfers the usage data along with the reference DL ID and index DL ID to reference circuitry 122. Reference circuitry 122 receives the reference DL ID, index DL ID, and the usage data from wireless communication network 110. In response to the reference DL ID and index DL ID, reference circuitry 122 executes reference DL chain code 126 for reference DL 124. In response to the code execution, reference circuitry 122 stores the usage data in reference DL blocks.

Reference circuitry 122 detects exhaustion for reference DL 124. In response to an abstraction trigger, reference circuitry 122 generates a usage abstraction of the usage data. Reference circuitry 122 transfers the index DL ID, reference DL ID, the usage abstraction, and exhaustion notice to index circuitry 121. Index circuitry 121 receives the index DL ID, reference DL ID, usage abstraction, and exhaustion notice. In response to the index DL ID, index circuitry 121 executes index DL chain code 125 for index DL 123. In response to the code execution, index circuitry 121 stores the usage abstraction a new index DL block.

In response to the exhaustion notice, index circuitry 121 transfers a reference DL request to reference circuitry 122 to establish a new reference DL for wireless communication network 110. Reference circuitry 122 receives the reference DL request and starts a new reference DL having a new reference DL ID and new reference chain code. Reference circuitry 122 transfers a reference DL response that indicates the index DL ID and new reference DL ID to index circuitry 121. Index circuitry 121 receives the reference DL response and associates wireless communication network 110, the index DL ID, and the new reference DL ID with one another. Index circuitry 121 transfers a usage data response that indicates the new reference DL ID and the index DL ID to wireless communication network 110.

UEs 101-103 use wireless communication network 110 for wireless data services. Wireless communication network 110 generates and transfers the usage data, index DL ID, and new reference DL ID and to reference circuitry 122. Reference circuitry 122 receives the new reference DL ID, index DL ID, and the usage data from wireless communication network 110. In response to the new reference DL ID and index DL ID, reference circuitry 122 executes the new reference DL chain code for the new reference DL. In response to the code execution, reference circuitry 122 stores the usage data in new reference DL blocks. The process then repeats and reference circuitry 122 stores more usage data, transfers more usage abstractions and exhaustion notices, and serves usage analytics circuitry 130 with usage data.

The exhaustion process may be used to switch from one reference DL to another or to add another reference DL while still using the existing DL. For example, the exhaustion process could be used to modify the reference chain code by replacing reference DLs and their chain code. The exhaustion process could be used to add new reference DLs with new reference chain code for new wireless data services while continuing to use older reference DLs.

Figure 5:
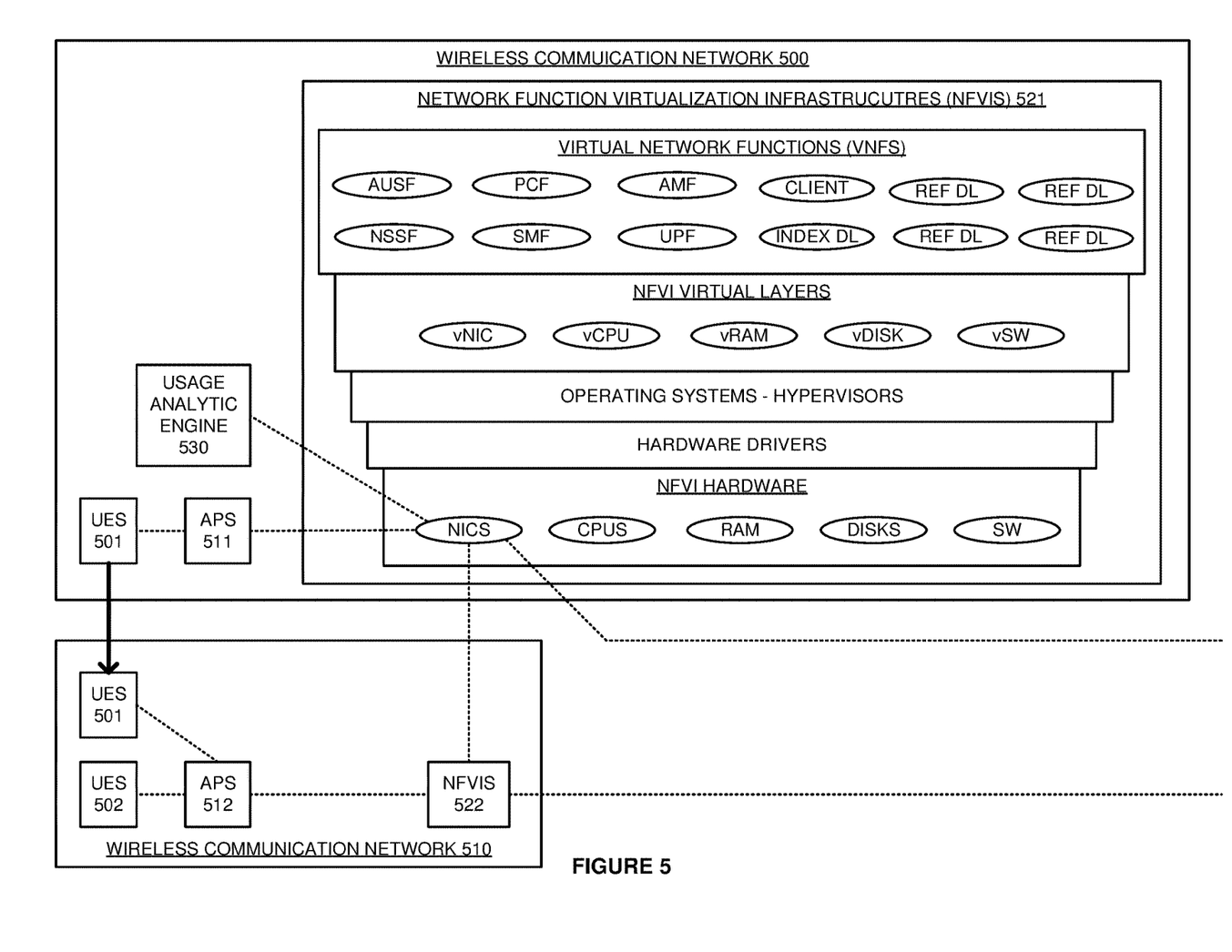
FIG. 5 illustrates a wireless communication network having a Network Function Virtualization Infrastructure (NFVI) that indexes usage data from other wireless communication networks for a usage analytics engine.

FIG. 5 illustrates wireless communication network 500 having Network Function Virtualization Infrastructures (NFVIs) 521 that index usage data from wireless communication network 510 for usage analytics engine 530. NFVIs 521 are an example of data communication circuitry 120, although circuitry 120 may differ. Wireless communication network 500 comprises UEs 501, APs 511, NFVIs 521, and usage analytic engine 530. Wireless communication network 510 comprises UEs 502, APs 512, and NFVIs 522. UEs 502, APs 512, and NFVIs 522 are configured and operate like UEs 501, APs 511, and NFVIs 521.

NFVIs 521 comprise NFVI hardware, hardware drivers, operating systems and hypervisors, NFVI virtual layers, and Virtual Network Functions (VNFs). The NFVI hardware comprises Network Interface Cards (NICs), CPUs, RAM, disk storage, and data switches (SW). The virtual layers comprise virtual NICs (vNIC), virtual CPUs (vCPU), virtual RAM (vRAM), virtual Disk Storage (vDISK), and virtual Switches (vSW). The NICs of NFVIs 521 are coupled to one another over data communication links.

The VNFs in NFVIs 521 comprise a Distributed Ledger (DL) client, index DL, and reference (REF) DLs. The VNFs also comprise Authentication and Security Function (AUSF), Policy Control Function (PCF), Access and Mobility Management Function (AMF), Network Slice Selection Function (NSSF), Session Management Function (SMF), User Plane Function (UPF), and other Fifth Generation Core (5GC) network functions which are omitted for clarity. The NFVI hardware in NFVIs 521 executes the hardware drivers, operating systems, hypervisors, virtual layers, and VNFs to serve UEs 501 over APs 511. In a like manner, NFVIs 522 execute their hardware drivers, operating systems, hypervisors, virtual layers, and VNFs to serve UEs 502 over APs 512.

In NFVIs 521, the DL client transfers a usage data request for wireless communication network 510 to the index DL which has an index DL ID. The index DL transfers a reference DL request for wireless communication network 510 to a reference DL which has a reference DL ID. The reference DL associates wireless communication network 510 with the index DL ID and the reference DL ID. The reference DL transfers a reference DL response to the index DL that indicates the reference DL ID. The index DL associates wireless communication network 510 with the index DL ID and the reference DL ID. The index DL transfers a usage data response to the DL client that indicates the reference DL ID for wireless communication network 510. The DL client transfers the reference DL ID to NFVIs 522 for delivery to the accounting servers that receive usage data from the UPFs that serve UEs 501.

As indicated by the arrow, UEs 501 move from wireless communication network 500 to wireless communication network 510—although physical mobility is not required. After the network move, NFVIs 522 serve UEs 501 over APs 512. In NFVIs 522, the VNFs (typically UPFs and accounting servers) generate Call Detail Records (CDRs) or other usage data that characterizes the delivery of wireless data services to UEs 501. The VNFs in NFVIs 522 transfer the CDRs for UEs 501 and the reference DL ID to the DL client in NFVIs 521. The DL client in NFVIs 521 transfers the CDRs and the reference DL ID to the corresponding reference DL.

The reference DL receives the CDRs and the reference DL ID from the DL client. The reference DL executes its chain code to classify the CDRs. CDR classification entails the determination of a network service and plan. The reference DL executes its chain code to rate the classified CDRs. CDR rating entails determining a monetary cost based on the classification and metrics like duration/amount, location, and time/date. The reference DL executes its chain code to store the rated CDRs in one or more reference DL blocks. The typical reference DL block includes the reference DL ID, index DL ID, one or more CDRs, classification/rating metadata, and a hash of the previous reference block.

After a pre-determined number of CDRs are received since the last CDR abstraction or after a pre-determined time-period, the reference DL chain code abstracts the rated CDRs. The chain code may use a CDR mask to select data for the abstraction. The chain code determines an abstraction ID and associates the abstraction ID with the abstracted CDRs. The reference DL transfers the CDR abstraction and abstraction ID to the index DL. The index DL executes its index chain code to store the CDR abstraction in an index DL block. The typical index DL block includes the index DL ID, reference DL ID, abstraction ID, CDR abstraction, and a hash of the previous index block.

Over time, the reference DL may store large amounts of rated CDRs, and the index DL may store a smaller amount of CDR abstractions. After storing a pre-determined amount of the CDRs or the expiration of a time period, the reference DL transfers an exhaustion notice to the index DL. The index DL receives the exhaustion notice and transfers another reference DL request to another one of the reference DLs for wireless communication network 510. The operation then repeats with the new reference DL. Over time, several reference DLs may store huge amounts of rated CDRs, and the index DL may store a more moderate amount of CDR abstractions.

To add additional reference DLs that operate in parallel for wireless communication network 510, the DL client transfers additional usage data requests to the index DL. The DL client then sends the resulting reference DL IDs to NFVIs 522. When multiple reference DLs are used, the DL client adds service data or some other codes so NFVIs 522 can properly label the CDRs with the correct service data/codes. The same CDR may be sent to multiple reference DLs. In addition, wireless communication network 510 is divided into geographic areas. The CDRs indicate the specific geographic areas where UEs 501 receive their wireless data services. The CDR abstractions may also indicate these specific geographic areas. In NFVIs 522, the DL client transfers the index DL IDs, the reference DL IDs, and any service data or other codes to usage analytics engine 530.

Consider an example where wireless communication network 500 has limited Fifth Generation New Radio (5GNR) resources in a geographic area that is served by wireless communication network 510. Usage analytics engine 530 is configured to operate as follows. Usage analytics engine 530 generates a CDR abstraction request for the index DL of wireless communication network 510. The CDR abstraction request includes the reference DL ID and a timeframe. Usage analytics engine 530 transfers the CDR abstraction request to the index DL. The index DL receives the request and retrieves the CDR abstractions for the reference DL ID and timeframe. The index DL transfers the CDR abstractions to usage analytics circuitry 130.

Usage analytics circuitry 130 processes the CDR abstractions to detect spikes in service costs for UEs 501 in particular geographic areas of wireless communication network 510. In response to a cost spike, usage analytics engine 530 generates a CDR request for the reference DL and CDR abstraction IDs. Usage analytics engine 530 transfers the CDR request to the reference DL. The reference DL retrieves the CDRs for the reference DL ID and CDR abstraction IDs. The reference DL transfers the complete CDRs to usage analytics circuitry 530. Usage analytics circuitry 530 processes the CDRs for the geographic area to detect a surge in 5GNR usage by UEs 501 which caused the cost spike. In response to the surge in 5GNR usage by UEs 501 in the specific geographic area, wireless communication network 500 may deploy more 5GNR resources to that geographic area on a priority basis.

Figure 6:
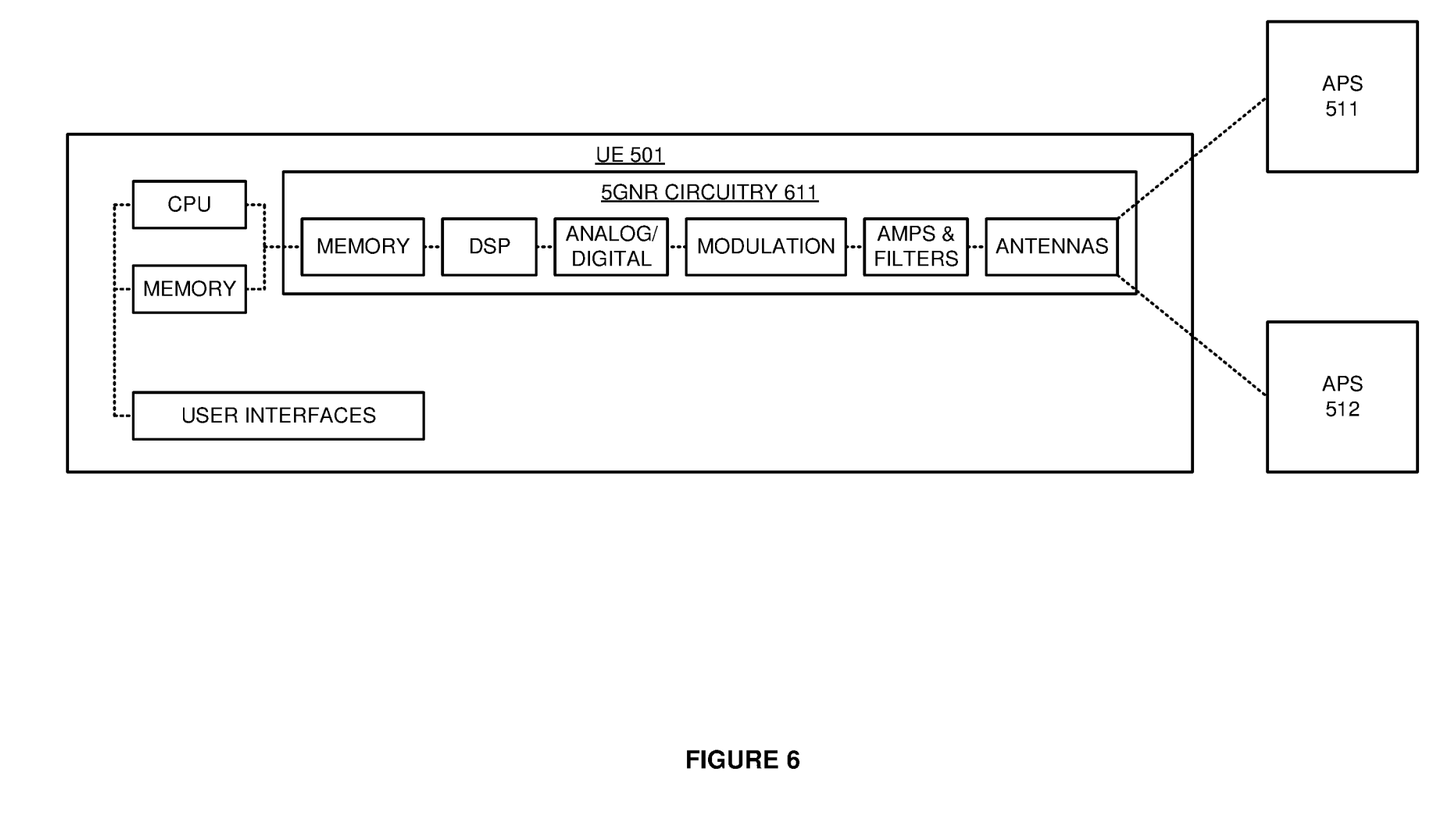
FIG. 6 illustrates a wireless User Equipment (UE).

FIG. 6 illustrates wireless User Equipment (UE) 501. UE 501 is an example of UEs 101-103, although these UEs may differ. UE 501 comprises Fifth Generation New Radio (5GNR) circuitry 611, CPU, memory, and user interfaces which are interconnected over bus circuitry. 5GNR circuitry 611 comprises antennas, amplifiers, filters, modulation, analog-to-digital interfaces, DSP, and memory that are coupled over bus circuitry. The antennas in UE 501 are coupled to APs 511-512 over wireless 5GNR links. The user interfaces comprise graphic displays, machine controllers, sensors, cameras, transceivers, and/or some other user components. The memories store operating systems, user applications, and network applications. The network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP).

The CPU executes the operating systems, user applications, and network applications to exchange network signaling and user data with APs 511-512 over 5GNR circuitry 611 and the 5GNR links. In UE 601, the CPU receives Uplink (UL) user data and signaling from the user applications and transfers user data and signaling to memory. The CPU executes the 5GNR network applications to process the UL user data and signaling and Downlink (DL) 5GNR signaling to generate UL 5GNR symbols that carry 5GNR data and RRC/N1 signaling. In 5GNR circuitry 611, the DSP processes the UL 5GNR symbols to generate corresponding digital signals for the analog-to-digital interfaces.

The analog-to-digital interfaces convert the digital UL signals into analog UL signals for modulation. Modulation up-converts the UL signals to their carrier frequencies. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL RRC/N1 signaling and 5GNR data to APs 511-512.

In 5GNR circuitry 611, the antennas receive wireless signals from APs 511-512 that transport Downlink (DL) RRC/N1 signaling and 5GNR data. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSP. The DSP recovers DL 5GNR symbols from the DL digital signals. The DSP transfer the DL 5GNR symbols to memory. The CPUs execute the 5GNR network applications to process the DL 5GNR symbols and recover the DL RRC/N1 signaling and 5GNR data. The CPUs transfer corresponding user data and signaling to the user applications. The user applications process the DL user data and signaling to interact with the user interfaces.

In some examples, the RRC, SDAP, or a user application in UE 501 may receive usage reporting instructions having the reference DL ID, and in response, transfer usage data having the reference DL ID to the DL client in NFVIs 521 for handling by a reference DL and an index DL.

Figure 7:
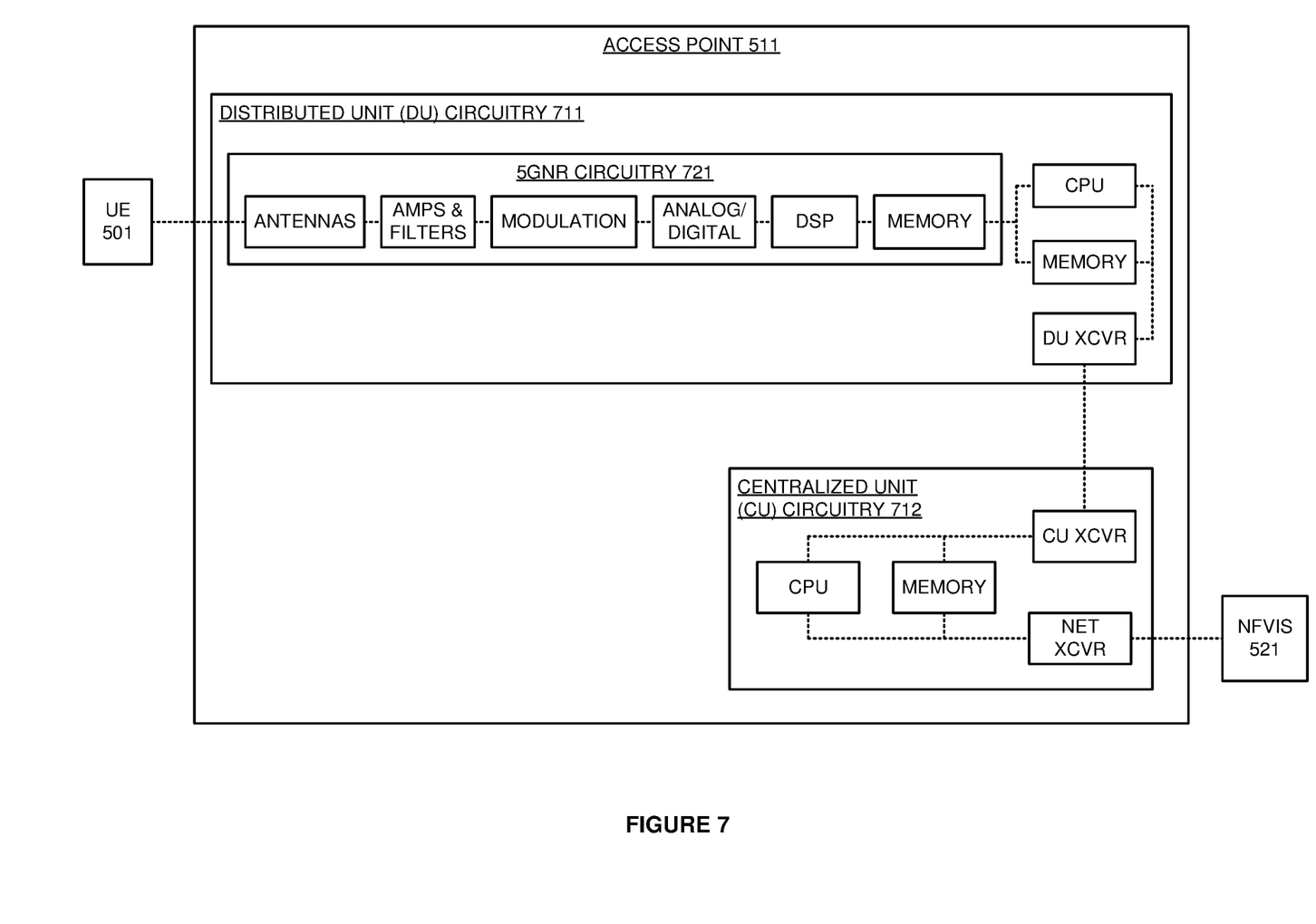
FIG. 7 illustrates a wireless Access Point (AP).

FIG. 7 illustrates wireless Access Point (AP) 511. AP 511 is an example of the APs in wireless communication network 110, although these APs may differ. AP 511 comprises Distributed Unit (DU) circuitry 711 and Centralized Unit (CU) circuitry 712. DU circuitry 711 comprises 5GNR circuitry 721, CPUs, memory, and transceivers (DU XCVR) that are coupled over bus circuitry. 5GNR circuitry 721 comprises antennas, amplifiers, filters, modulation, analog-to-digital interfaces, DSP, and memory that are coupled over bus circuitry. CU circuitry 712 comprises CPU, memory, and transceivers that are coupled over bus circuitry.

UE 501 is wirelessly coupled to the antennas in 5GNR circuitry 721 over the wireless 5GNR links. The DU transceivers in DU circuitry 721 are coupled to the CU transceivers in CU circuitry 712 over network data links. The network transceivers in CU circuitry 712 are coupled to NFVIs 521 over N2 links and N3 links.

In DU circuitry 711, the memories store operating systems and network applications. The network applications include at least some of: PHY, MAC, RLC, PDCP, RRC, and SDAP. In CU circuitry 712, the memories store operating systems, virtual components, and network applications. The virtual components comprise hypervisor modules, virtual switches, virtual machines, and/or the like. The network applications comprise at least some of: PHY, MAC, RLC, PDCP, RRC, and SDAP.

The CPU in CU circuitry 712 executes some or all of the 5GNR network applications to drive the exchange of 5GNR data and signaling between UE 501 and NFVIs 521. The CPU in DU circuitry 711 executes some or all of the 5GNR network applications to drive the exchange of 5GNR data and signaling between UE 501 and NFVIs 521. The functionality split of the 5GNR network applications between DU circuitry 711 and CU circuitry 712 may vary. CU circuitry 712 may hosts VNFs in the same manner as NFVIs 521.

In 5GNR circuitry 721, the antennas receive wireless signals from UE 501 that transport UL 5GNR data and RRC/N1 signaling. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL 5GNR symbols from the UL digital signals. In DU circuitry 711 and/or CU circuitry 712, the CPUs execute the 5GNR network applications to process the UL 5GNR symbols to recover the UL RRC/N1 signaling and 5GNR data. The network applications process the UL RRC/N1 signaling, UL 5GNR data, DL N2/N1 signaling, and DL N3 data to generate DL RRC/N1 signaling, DL 5GNR data, UL N2/N1 signaling, and UL N3 data. In CU circuitry 712, the network transceivers transfer the UL N2/N1 signaling and UL N3 data to NFVIs 521 over the N2 and N3 links.

In CU circuitry 712, the network transceivers receive the DL N2/N1 signaling and DL N3 data from NFVIs 521 over the N2 and N3 links. In DU circuitry 711 and/or CU circuitry 712, the CPUs execute the 5GNR network applications to process the DL N2/N1 signaling and N3 data to generate the DL RRC/N1 signaling and the DL 5GNR data. The network applications process the DL RRC/N1 signaling and DL 5GNR data to generate DL 5GNR symbols. In DU circuitry 711, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL RRC/N1 signaling and 5GNR data to UE 501 over the 5GNR links.

In some examples, the RRC, SDAP, or VNF in CU circuitry 712 of AP 511 may receive usage reporting instructions having the reference DL ID, and in response, transfer usage data having the reference DL ID to the DL client in NFVIs 521 for handling by a reference DL and an index DL.

Figure 8:
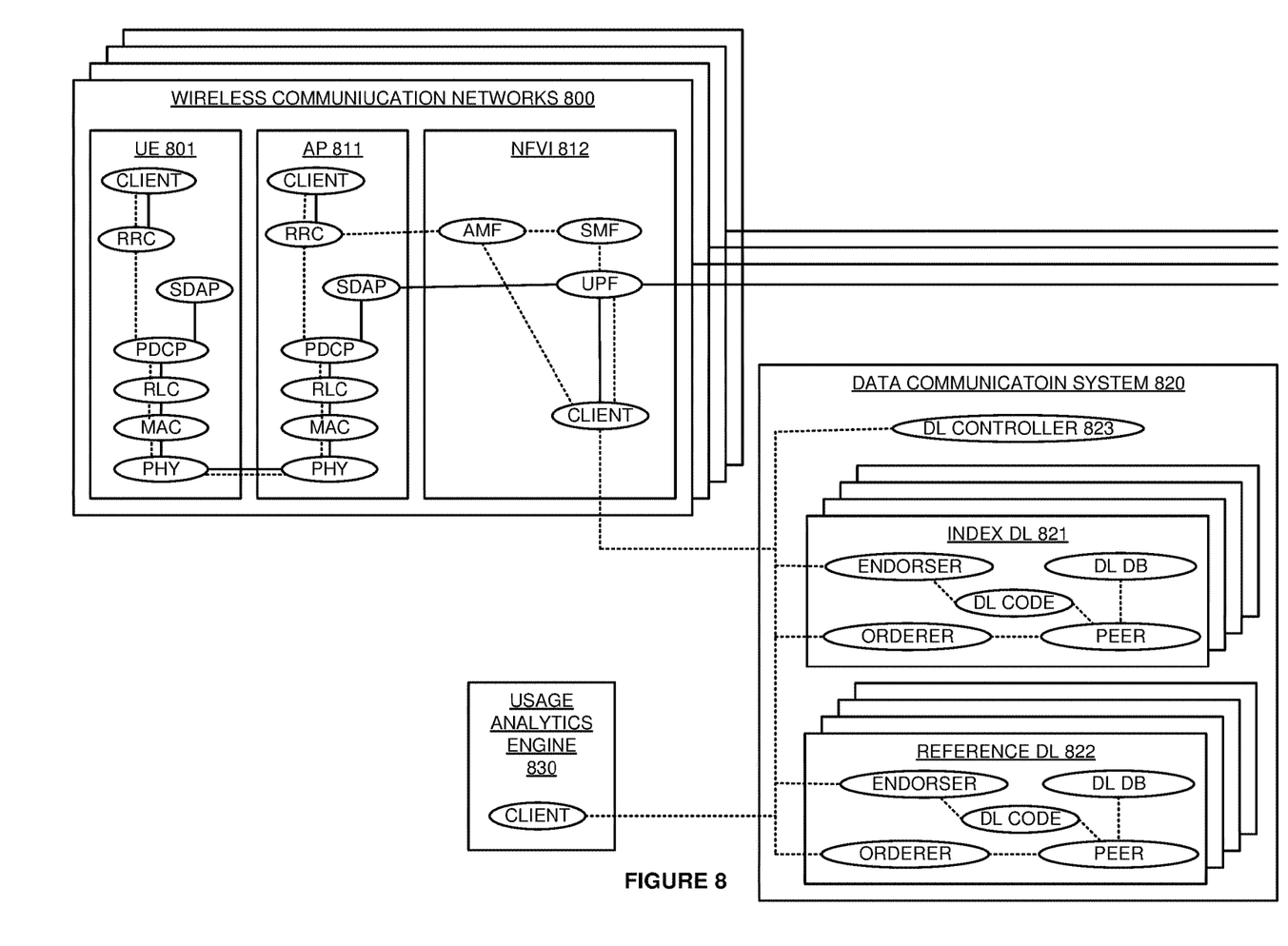
FIG. 8 illustrates a data communication system that indexes usage data for multiple wireless communication networks for a usage analytics engine.

FIG. 8 illustrates data communication system 820 that indexes usage data from multiple wireless communication networks 800 for usage analytics engine 830. Wireless communication networks 800 are an example of wireless communication network 110, although network 110 may differ. Data communication system 820 is an example of data communication system 120, although system 120 may differ. Wireless communication networks 800 comprise UE 801 AP 811, and NFVI 812. Wireless communication networks 800 have many other UEs, APs, and NFVIs. Data communication system 820 comprises index DL 821, reference DL 822, and DL controller 823. Index DL 821 comprises an endorser node, orderer node, peer node, index DL code, and DL database (DB). Reference DL 822 comprises an endorser node, orderer node, peer node, reference DL code, and DL database. The other index DLs and reference DLs have endorser nodes, orderer nodes, peer nodes, DL code, and DL databases.

NFVI 812 executes the client which transfers a data request to DL controller 823 in data communication system 820. DL controller 823 responsively initiates index DL 821 and transfers a corresponding request to an endorser node in index DL 821. The endorser node executes the index DL code in index DL 821 to process the request and select reference DL 822 for the client in NFVI 812. The endorser node checks the code results against an endorsement rule set that has requirements, restrictions, and syntax which the code results must pass before endorsement. When the code result passes the endorsement rules, the endorser node transfers a transaction endorsement back to DL controller 823.

DL controller 823 transfers the endorsed transaction to an orderer node in index DL 821. The orderer node transfers the endorsed transaction to the peer nodes. The peer nodes independently execute the index DL code to re-process the data request and select reference DL 822 for client in NFVI 812. The peer nodes share their code result (reference DL 822 for the client in NFVI 812 and other pertinent data). The peer nodes that have the same code result join a consensus for that result. When a consensus of peer nodes is formed (like 50%), then the peer nodes store the consensus result in the DL databases (DBs) using a blockchain format. The blockchain format stores data in blocks that include a hash of the previous block to form the blockchain. A peer module initiates reference DL 822 and transfers the ID for reference DL 822 to DL controller 823. DL controller 823 transfers the ID for reference DL 822 to the client in NFVI 812.

The RRC in UE 801 and the RRC in AP 811 exchange 5GNR RRC/N1 signaling over their respective PDCPs, RLCs, MACs, and PHYs. The RRC in AP 811 and the AMF in NFVI 812 exchange corresponding 5GNR N2/N1 signaling. The AMF interacts with UE 801 over N1 and with other VNFs like AUSF and UDM to perform UE authentication and security. The AMF interacts with UE 801 over N1 and with other VNFs like PCF and SMF to perform service selection. The AMF and SMF select bearers and QoS for the selected service. In response to bearer and QoS selection, the SMF transfers N4 signaling to the UPF that indicates the selected bearers, QoS, and other information for the selected service for UE 801. The AMF transfers N2 signaling to the RRC in AP 811 that indicates the selected bearers, QoS, and other information for the selected service for UE 801. The AMF transfers N1 signaling to the RRC in UE 801. The RRC in AP 811 transfers RRC signaling to UE 801 that carries the N1 signaling and that indicates the selected bearers, QoS, and other information for the selected service for UE 801.

The RRC in UE 801 configures its SDAP, PDCP, RLC, MAC, and PHY to communicate with AP 811. The RRC in AP 811 configures its SDAP, PDCP, RLC, MAC, and PHY to communicate with UE 801. The SDAP in UE 801 and the SDAP in AP 811 exchange user data over their PDCPs, RLCs, MACs, and PHYs. The SDAP in AP 811 and the UPF exchange the user data over one or more N3 links. The UPF and an external system exchange the user data over an N6 link.

The UPF generates usage data like CDRs that characterize the user data exchange by time, location, device, service, amount, and the like. The UPF transfers the CDRs to the client—typically through an accounting system that formats and filters out the CDRs for UE 801 and transfers them to the client in NFVI 812. The client in NFVI 812 transfers the CDRs for UE 801 to an endorser node in reference DL 822.

The endorser node in reference DL 822 executes the reference DL code in reference DL 822 to classify and rate the CDRs. The endorser node checks the code results (accounting statement) against an endorsement rule set. The endorser node transfers a transaction endorsement back to the client in NFVI 812. The client in NFVI 812 transfers the endorsed transaction an orderer node in reference DL 822. The orderer node transfers the endorsed transaction to the appropriate peer nodes.

The peer nodes independently execute reference DL code to classify and rate the CDRs. The peer nodes share their chain code result (accounting statement) to form a consensus for the result. After consensus, the peer nodes store the consensus result in the DL databases using a blockchain format.

At a pre-determined number of CDRs, the chain code drives the endorser nodes and peer nodes to generate an abstract of the CDRs and transfer the CDR abstract to index DL 821. The abstract may be a significant data redaction on individual CDRs like passing only UE ID, rough location, classification, and rate in the abstract.

A peer node in reference DL 822 transfers the CDR abstracts to an endorser node in index DL 821. The endorser node in index DL 821 executes its index DL code to process the CDR abstracts. The endorser node checks the code results (store CDR abstracts) before transferring a transaction endorsement back to the peer node in reference DL 822. The peer node in reference DL 822 transfers the endorsed transaction an orderer node in index DL 821. The orderer node transfers the endorsed transaction to the appropriate peer nodes in index DL 821.

In index DL 821, the peer nodes independently execute their index DL code to identify CDR abstract storage. The peer nodes share their code result (CDR abstract storage) to form a consensus for the result. After consensus, the peer nodes store the CDR abstracts in the DL databases using a blockchain format.

At a pre-determined number of CDRs or CDR abstracts, the reference DL code in reference DL 822 drives the endorser nodes and peer nodes to generate a reference DL exhaustion notice. The DL exhaustion notice may indicate another reference DL for the client. A peer node in reference DL 822 transfers the DL exhaustion notice to an endorser node in index DL 821. The endorser node in index DL 821 executes its index DL code to process the DL exhaustion notice. The endorser node checks the code results (new reference DL for the client in NFVI 812) before transferring a transaction endorsement back to the peer node in reference DL 822. The peer node in reference DL 822 transfers the endorsed transaction to an orderer node in index DL 821. The orderer node transfers the endorsed transaction to the appropriate peer nodes in index DL 821.

In index DL 821, the peer nodes independently execute their index DL code to identify a new reference DL for the DL client in NFVI 812. The peer nodes share their code result (new reference DL for the client in NFVI 812) to form a consensus for the result. After consensus, the peer nodes store the result in the DL databases using a blockchain format. A peer module in index DL 821 initiates a new reference DL and transfers the ID for the new reference DL to DL controller 823. DL controller 823 transfers the ID for the new reference DL to the client in NFVI 812. The client now transfers CDRs for data communication system 820 to the new reference DL.

The wireless data network circuitry described above comprises computer hardware and software that form special-purpose data communication circuitry to index wireless network usage data for usage analytics. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to index wireless network usage data for usage analytics.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of presenting usage data for a wireless communication network, the method comprising:

index circuitry receiving a usage data request for the wireless communication network and transferring a reference Distributed Ledger (DL) request;

reference circuitry receiving the reference DL request and transferring a reference DL response indicating a reference DL Identifier (ID);

the index circuitry receiving the reference DL response and transferring a usage data response indicating the reference DL ID for the wireless communication network;

the reference circuitry receiving the reference DL ID and the usage data from the wireless communication network, executing reference DL chain code, storing the usage data and last reference block hashes in reference DL blocks, generating a usage abstraction of the usage data, and transferring the reference DL ID and the usage abstraction;

the index circuitry receiving the reference DL ID and the usage abstraction, executing index DL chain code, storing the usage abstraction, the reference DL ID, and last index block hash in a new index DL block, receiving an index data request for the wireless communication network having the reference DL ID, and transferring the usage abstraction and the reference DL ID for the usage abstraction responsive to the index data request; and the reference circuitry receiving a reference data request having the reference DL ID and usage abstraction IDs and transferring the usage data.

2. The method of claim 1 wherein the reference circuitry receiving the usage data from the wireless communication network comprises receiving Call Detail Records (CDRs).

3. The method of claim 1 wherein the reference circuitry generating the usage abstraction of the usage data comprises abstracting Call Detail Records (CDRs).

4. The method of claim 1 wherein the reference circuitry generating and transferring the usage abstraction comprises generating and transferring the usage abstraction responsive to receiving a pre-determined amount of the usage data.

5. The method of claim 1 wherein the reference circuitry generating and transferring the usage abstraction comprises generating and transferring the usage abstraction on a periodic time basis.

6. The method of claim 1 wherein the reference circuitry storing the usage data, generating the usage abstraction, and transferring the usage abstraction comprises rating network usage based on the usage data, storing the rated network usage, generating the usage abstraction of the rated network usage, and transferring the usage abstraction of the rated network usage.

7. The method of claim 1 wherein the reference circuitry storing the usage data, generating the usage abstraction, and transferring the usage abstraction comprises classifying network usage based on the usage data, storing the classified network usage, generating the usage abstraction of the classified network usage, and transferring the usage abstraction of the classified network usage.

8. The method of claim 1 further comprising:

the reference circuitry transferring a reference DL exhaustion notice responsive to storing the usage data;

the index circuitry receiving the reference DL exhaustion notice and transferring another reference DL request;

the reference circuitry receiving the other reference DL request and transferring another reference DL response indicating another reference DL ID;

the index circuitry receiving the other reference DL response and transferring another usage data response indicating the other reference DL ID to the wireless communication network;

the reference circuitry receiving the other reference DL ID and other usage data from the wireless communication network, executing other reference DL chain code, storing the other usage data and other last reference block hashes in other reference DL blocks, generating another usage abstraction of the other usage data, and transferring the other reference DL ID and the other usage abstraction;

the index circuitry receiving the other usage abstraction and the other reference DL ID, executing the index DL chain code, storing the other usage abstraction, the other reference DL ID, and another index DL hash of the previous index DL block in another new index DL block, receiving another index data request for the wireless communication network, and transferring the other usage abstraction and the other reference DL ID responsive to the other index data request; and the reference circuitry receiving another reference data request having the other reference DL ID and transferring the other usage data.

9. The method of claim 1 further comprising:

the index circuitry receiving another data request for the wireless communication network and transferring another reference DL request;

the reference circuitry receiving the other reference DL request and transferring another reference DL response indicating another reference DL ID;

the index circuitry receiving the other reference response and transferring other usage data response indicating the other reference DL ID for the wireless communication network;

the reference circuitry receiving the other reference DL ID and other usage data for the wireless communication network, executing other reference DL chain code, storing the other usage data and other last reference block hashes in other reference DL blocks, generating another usage abstraction of the other usage data, and transferring the other reference DL ID and the other usage abstraction;

the index circuitry receiving the other usage abstraction and the other reference DL ID, storing the other usage abstraction, the other reference DL ID, and another index DL hash of the previous index DL block in another new index DL block, receiving another index data request for the wireless communication network, and transferring the other usage abstraction and the other reference DL ID responsive to the other index data request; and the reference circuitry receiving another reference data request having the other reference DL ID and transferring the other usage data.

10. The method of claim 1 wherein the wireless communication network is divided into multiple geographic areas and the usage data is from one of the geographic areas and further comprising the index circuitry associating the usage abstraction and the index link with the one of the geographic areas.

11. A wireless communication network comprising:

index circuitry configured to receive a usage data request for the wireless communication network and transfer a reference Distributed Ledger (DL) request;

reference circuitry configured to receive the reference DL request and transfer a reference DL response indicating a reference DL Identifier (ID);

the index circuitry configured to receive the reference DL response and transfer a usage data response indicating the reference DL ID for the wireless communication network;

the reference circuitry configured to receive the reference DL ID and the usage data from the wireless communication network, execute reference DL chain code, store the usage data and last reference block hashes in reference DL blocks, generate a usage abstraction of the usage data, and transfer the reference DL ID and the usage abstraction;

the index circuitry configured to receive the reference DL ID and the usage abstraction, execute index DL chain code, store the usage abstraction, the reference DL ID, and last index block hash in a new index DL block, receive an index data request for the wireless communication network having the reference DL ID, and transfer the usage abstraction and the reference DL ID for the usage abstraction responsive to the index data request; and the reference circuitry configured to receive a reference data request having the reference DL ID and usage abstraction IDs and transfer the usage data.

12. The wireless communication network of claim 11 wherein the usage data comprises Call Detail Records (CDRs).

13. The wireless communication network of claim 11 wherein the abstraction of the usage data comprises abstractions of Call Detail Records (CDRs).

14. The wireless communication network of claim 11 wherein the reference circuitry is configured to generate and transfer the usage abstraction responsive to receiving a pre-determined amount of the usage data.

15. The wireless communication network of claim 11 wherein the reference circuitry is configured to generate and transfer the usage abstraction on a periodic time basis.

16. The wireless communication network of claim 11 wherein the reference circuitry is configured to rate network usage based on the usage data, store the rated network usage, generate the usage abstraction of the rated network usage, and transfer the usage abstraction of the rated network usage.

17. The wireless communication network of claim 11 wherein the reference circuitry is configured to classify network usage based on the usage data, store the classified network usage, generate the usage abstraction of the classified network usage, and transfer the usage abstraction of the classified network usage.

18. The wireless communication network of claim 11 further comprising:

the reference circuitry configured to transfer a reference DL exhaustion notice responsive to storing the usage data;

the index circuitry configured to receive the reference DL exhaustion notice and transfer another reference DL request;

the reference circuitry configured to receive the other reference DL request and transfer another reference DL response indicating another reference DL ID;

the index circuitry configured to receive the other reference DL response and transfer another usage data response indicating the other reference DL ID to the wireless communication network;

the reference circuitry configured to receive the other reference DL ID and other usage data from the wireless communication network, execute other reference DL chain code, store the other usage data and other last reference block hashes in other reference DL blocks, generate another usage abstraction of the other usage data, and transfer the other reference DL ID and the other usage abstraction;

the index circuitry configured to receive the other usage abstraction and the other reference DL ID, execute the index DL chain code, store the other usage abstraction, the other reference DL ID, and another index DL hash of the previous index DL block in another new index DL block, receive another index data request for the wireless communication network, and transfer the other usage abstraction and the other reference DL ID responsive to the other index data request; and the reference circuitry configured to receive another reference data request having the other reference DL ID and transfer the other usage data.

19. The wireless communication network of claim 11 further comprising:

the index circuitry configured to receive another data request for the wireless communication network and transfer another reference DL request;

the reference circuitry configured to receive the other reference DL request and transfer another reference DL response indicating another reference DL ID;

the index circuitry configured to receive the other reference response and transfer other usage data response indicating the other reference DL ID for the wireless communication network;

the reference circuitry configured to receive the other reference DL ID and other usage data for the wireless communication network, execute other reference DL chain code, store the other usage data and other last reference block hashes in other reference DL blocks, generate another usage abstraction of the other usage data, and transfer the other reference DL ID and the other usage abstraction;

the index circuitry configured to receive the other usage abstraction and the other reference DL ID, store the other usage abstraction, the other reference DL ID, and another index DL hash of the previous index DL block in another new index DL block, receive another index data request for the wireless communication network, and transfer the other usage abstraction and the other reference DL ID responsive to the other index data request; and the reference circuitry configured to receive another reference data request having the other reference DL ID and transfer the other usage data.

20. The wireless communication network of claim 11 wherein the wireless communication network is divided into multiple geographic areas and the usage data is from one of the geographic areas and further comprising the index circuitry configured to associate the usage abstraction and the reference DL ID with the one of the geographic areas.

* * * * *